US011514350B1

(12) United States Patent
Kaneko et al.

(10) Patent No.: US 11,514,350 B1
(45) Date of Patent: Nov. 29, 2022

(54) MACHINE LEARNING DRIVEN EXPERIMENTAL DESIGN FOR FOOD TECHNOLOGY

(71) Applicant: NotCo Delaware, LLC, Santiago (CL)

(72) Inventors: Kyohei Kaneko, Oakland, CA (US); Yoav Navon, Santiago (CL); Isadora Nun, San Francisco, CA (US); Aadit Patel, Burlingame, CA (US); Nathan O'Hara, Westwood, MA (US); Eugenio Herrera, Santiago (CL); Ofer Philip Korsunsky, Orinda, CA (US); Karim Pichara, San Francisco, CA (US)

(73) Assignee: NotCo Delaware, LLC, Santiago (CL)

( * ) Notice: Subject to any disclaimer, the term of this patent is extended or adjusted under 35 U.S.C. 154(b) by 0 days.

(21) Appl. No.: 17/307,950

(22) Filed: May 4, 2021

(51) Int. Cl.
  G06N 7/00 (2006.01)
  G06N 20/00 (2019.01)

(52) U.S. Cl.
  CPC ............. G06N 7/005 (2013.01); G06N 20/00 (2019.01)

(58) Field of Classification Search
  CPC .......... G06N 7/00; G06N 20/00; G06N 20/10; G06N 20/20; G06N 7/005
  USPC .......................................................... 706/12
  See application file for complete search history.

(56) References Cited

U.S. PATENT DOCUMENTS

| | | | |
|---|---|---|---|
| 8,419,433 B2 * | 4/2013 | Do ...................... | G06F 16/9535 219/385 |
| 8,647,121 B1 * | 2/2014 | Witlin ................ | G09B 19/0092 434/127 |
| 8,775,341 B1 | 7/2014 | Commons | |
| 9,519,620 B1 | 12/2016 | Pinel et al. | |
| 9,841,897 B2 * | 12/2017 | Palmer ............... | G06Q 30/0201 |
| 10,325,181 B2 | 6/2019 | Xu et al. | |
| 10,515,715 B1 | 12/2019 | Pappas et al. | |
| 10,915,818 B1 | 2/2021 | Patel et al. | |
| 10,957,424 B1 | 3/2021 | Navon et al. | |

(Continued)

FOREIGN PATENT DOCUMENTS

| | | |
|---|---|---|
| WO | 2004083451 A1 | 9/2004 |
| WO | 2013052824 A1 | 4/2013 |

(Continued)

OTHER PUBLICATIONS

Optimization of Formulations Using Robotic Experiments Driven by Machine Learning DoE (Year: 2021).*

(Continued)

*Primary Examiner* — George Giroux
(74) *Attorney, Agent, or Firm* — Haverstock & Owens, A Law Corporation

(57) ABSTRACT

Techniques to generate experiment trials using artificial intelligence are disclosed. A training set for an experiment generator is continuously built up by using assessed experiment trials. The experiment generator is optimized using one of a plurality of optimization algorithms, depending on which mode experiment generator is to run in for an experiment. The mode is dependent on the experiment mode of the experiment. The experiment generator generates a batch of one or more experiment trials for the experiment. Any of the generated experiment trials may be tried or experimented by a user and may be updated with assessment data as an assessed experiment trial.

21 Claims, 17 Drawing Sheets

(56) References Cited

U.S. PATENT DOCUMENTS

| | | | |
|---|---|---|---|
| 10,962,473 | B1 | 3/2021 | O'Hara et al. |
| 10,970,621 | B1 | 4/2021 | Pichara et al. |
| 10,984,145 | B1 | 4/2021 | Hutchinson et al. |
| 10,993,465 | B2 | 5/2021 | Pichara et al. |
| 11,164,069 | B1 | 11/2021 | Korsunsky et al. |
| 11,164,478 | B2 | 11/2021 | Pichara et al. |
| 11,348,664 | B1 | 5/2022 | Kaneko et al. |
| 11,373,107 | B1 | 6/2022 | Clavero et al. |
| 2002/0184167 | A1 | 12/2002 | McClanahan |
| 2003/0157725 | A1 | 8/2003 | Franzen et al. |
| 2004/0153250 | A1 | 5/2004 | Hurst et al. |
| 2007/0139667 | A1 | 6/2007 | Russell et al. |
| 2009/0055247 | A1 | 2/2009 | Jackson |
| 2011/0020518 | A1 | 1/2011 | Delort et al. |
| 2013/0149679 | A1* | 6/2013 | Tokuda ............. A47J 36/321 434/127 |
| 2013/0222406 | A1 | 8/2013 | Wolfe et al. |
| 2016/0110584 | A1 | 4/2016 | Remiszewski et al. |
| 2016/0358043 | A1 | 12/2016 | Mu et al. |
| 2017/0116517 | A1 | 4/2017 | Chee et al. |
| 2017/0139902 | A1 | 5/2017 | Byron |
| 2017/0220558 | A1 | 8/2017 | Pinel et al. |
| 2017/0238590 | A1 | 8/2017 | Bansal-Mutalik et al. |
| 2017/0345185 | A1 | 11/2017 | Byron et al. |
| 2018/0101784 | A1 | 4/2018 | Rolfe et al. |
| 2018/0192680 | A1 | 7/2018 | Fraser |
| 2018/0203921 | A1 | 7/2018 | Privault et al. |
| 2018/0293489 | A1 | 10/2018 | Eyster et al. |
| 2018/0357299 | A1* | 12/2018 | Miranda ............. G06F 16/2358 |
| 2019/0171707 | A1 | 6/2019 | Rapaport |
| 2019/0200797 | A1 | 7/2019 | Diao et al. |
| 2019/0228855 | A1 | 7/2019 | Leifer et al. |
| 2019/0228856 | A1* | 7/2019 | Leifer ............. G06N 3/08 |
| 2019/0295440 | A1* | 9/2019 | Hadad ............. G06F 40/137 |
| 2020/0268032 | A1 | 8/2020 | Okuyama |
| 2020/0309746 | A1* | 10/2020 | Sakai ............. G01N 30/72 |
| 2020/0365053 | A1 | 11/2020 | Pichara |
| 2021/0027379 | A1* | 1/2021 | Zhu ............. G06Q 40/06 |

FOREIGN PATENT DOCUMENTS

| | | | |
|---|---|---|---|
| WO | 2016010097 | A1 | 1/2016 |
| WO | 2017070605 | A1 | 4/2017 |
| WO | WO 2020/237214 | | 11/2020 |
| WO | 2021026083 | A1 | 2/2021 |
| WO | 2021071756 | A1 | 4/2021 |

OTHER PUBLICATIONS

Optimization of Formulations Using Robotic Experiments Driven by Machine Learning DoE (Year: 2020).*

Pichara, U.S. Appl. No. 16/416,095, filed May 17, 2019, Office Action, dated Jul. 29, 2019.

Pichara, U.S. Appl. No. 16/416,095, filed May 17, 2019, Office Action, dated Mar. 16, 2021.

Pichara, U.S. Appl. No. 16/416,095, filed May 17, 2019, Final Office Action, dated Dec. 16, 2019.

Pichara, U.S. Appl. No. 16/406,095, filed May 17, 2019, Office Action, dated Nov. 4, 2020.

Zou et al., "Regularization and Variable Selection via the Elastic Net", Department of Statistics, Stanford University, dated Dec. 5, 2003, 29 pages.

The International Searching Authority, "Search Report" in application No. PCT/US2020/034385, dated Jul. 20, 2020, 7 pages.

Eating Bird Food, "Vegan "Chicken" Salad", https://www.eatingbirdfood.com/simple-vegan-mock-chicken-salad/, Apr. 5, 2017, downloaded Mar. 11, 2021. 2pgs.

Current Claims in application No. PCT/US2020/034385, dated Jul. 2020, 5 pages.

Current Claims in Canada application No. 3,083,036, dated Jun. 9, 2020, 5pgs.

Canada Patent Office, "Office Action", in application No. 3,083,036, dated Jul. 7, 2021, 5pgs.

Sigma-Aldrich, "IR Spectrum Table and Chart", https://www.sigmaaldrich.com/technical-documents/articles/biology/ir-spectrum-table.html, last viewed on Nov. 5, 2020, 6 pages.

SciPy.org, "scipy.signal.savgol_filter", https://docs.scipy.org/doc/scipy/reference/generated/scipy.signal.savgol_filter.html, last viewed on Nov. 5, 2020, 3 pages.

SciPy.org, "scipy.integrate.simps", https://docs.scipy.org/doc/scipy/reference/generated/scipy.integrate.simps.html, last viewed on Nov. 5, 2020, 2 pages.

Scikitlearn.org, "sklearn.neighbors.KNeighborsRegressor", https://scikit-learn.org/stable/modules/generated/sklearn.neighbors.KNeighborsRegressor.html, last viewed on Nov. 5, 2020, 5 pages.

Scikitlearn.org, "sklearn.model_selection.GridSearchCV", https://scikit-learn.org/stable/modules/generated/sklearn.model_selection.GridSearchCV.html, last viewed on Nov. 5, 2020, 7 pages.

Scikitlearn.org, "sklearn.linear_model.lasso", https://scikit-learn.org/stable/modules/generated/sklearn.linear_model.Lasso.html, last viewed on Nov. 5, 2020, 6 pages.

Scikitlearn.org, "sklearn.cross_decomposition.PLSRegression", https://scikit-learn.org/stable/modules/generated/sklearn.cross_decomposition.PLSRegression.html , last viewed on Nov. 5, 2020, 5 pages.

Scikitlearn.org, "3.2.4.1.3. sklearn.linear_model.LassoCV", https://scikit-learn.org/stable/modules/generated/sklearn.linear_model.LassoCV.html, last viewed on Nov. 5, 2020, 6 pages.

ProDry, "DSSP Tools", http://prody.csb.pitt.edu/manual/reference/proteins/dssp.html, last viewed on Nov. 5, 2020, 2 pages.

Cromwell et al., "Computational Creativity in the Culinary Arts", Proceedings of the Twenty-Eighth International Florida Artificial Intelligence Research Society Conference, dated 2015, 5 pages.

Park et al., "FlavorGraph: a large-scale food-chemical grpah for generating food representations and recommending food pairings", Scientific Reports: nature Research, vol. 11, Jan. 13, 2021, 13 pages.

Bowman et al., "Generating Sentences from a Continuous Space", May 2016.

Rudinger et al., Skip-Prop: Representing Sentences with One Vector Pre Proposition, 12th International Conference on Computational Semantics, dated 2017, 7 pages.

Karamanolakis et al., "Item Recommendation with Variational Autoencoders and Heterogeneous Priors", DLRS, dated Oct. 2018, 5 pages.

Rong, Xin. word2vec Parameter Learning Explained. arXiv:1411.2738v4 [cs.CL] Jun. 5, 2016. (Year: 2016).

Salvador, Amaia, et al. "Learning cross-modal embeddings for cooking recipes and food images." Proceedings of the IEEE conference on computer vision and pattern recognition. 2017. (Year: 2017).

David Xu, "Machine Learning for Flavor Development," Bachelor's Thesis, Harvard College, School of Engineering and Applied Sciences, Apr. 5, 2019, 69 pages.

Hattab et al., Application of an Inverse Neural Network Model for the Identification of Optimal Amendment to Reduce Copper Toxicity in Phytoremediated Contaminated Soils, Journal of Geochemical Exploration, Elsevier, 2014, 136, pp. 14-23, 2014. (Year: 2014).

Kieaibi E., Determination of Protein Secondary Structure from Infrared Spectra Using Partial Least-Squares Regression, 9 pages, 2016 (Year: 2016).

Yang et al., "Obtaining information about protein secondary structures in aqueous solution using Fourier transform IR spectroscopy", Published online Feb. 5, 2015, nature protocols, 16 pages.

XGBoost, "Python Package Introduction", https://xgboost.readthedocs.io/en/latest/python/python_intro.html, last viewed on Nov. 5, 2020, 5 pages.

GitHub.com, "CMBI/DSSP", https://github.com/cmbi/dssp, last viewed on Nov. 5, 2020. 4 pages.

Wilcox et al., "Determination of Protein Secondary Structure from Infrared Spectra Using Partial Least-Squares Regression", dated 2016 American Chemical Society, 9 pages.

Cromwell et al., "Computational Creativity in the Culinary Arts", Proceedings of the Twenty-Eighth International Florida Artificial Intelligence Research Society Conterence, dated 2015, 5 pages.

(56) References Cited

OTHER PUBLICATIONS

Yuan et al., "An Inductive Content-Augmented Network Embedding Model for Edge Artificial Intelligence", IEEE Transaction on Industrial Informatics, vol. 15 No. 7, Jul. 2019, pp. 4295-4305.
Hodgkin, "The Castlemaine Project: Development of an AI-based Drug Design Support System", Molecular Modelling and Drug Design, 1994, pp. 137-169.
Peiretti et al., "Artificial Intelligence: The Future for Organic Chemistry?", ACS Omega, 2018, 3 (10), pp. 13263-13266.
Fromm et al., "A Vector Space model for Neural Network Functions: Inspirations from Similarities between the Theory of Connectivity and the Logarithmic Time Course of Word Production", Frontiers in Systems Neuroscience, Aug. 28, 2020, 10 pages.
International Searching Authority, "Search Report" in application No. PCT/US2022/018481, dated Mar. 21, 2022, 12 pages.
Hahladakis et al., "An Overview of Chemical Additives Present in Plastics: Migration, Release, Fate and Environmental Impact During Their Use, Disposal and Recycling", Journal of Hazardous Materials 344 (2018), pp. 179-199.

\* cited by examiner

NEW EXPERIMENT — 324

Parameters 308

| | Name | Measurement unit | Type | Range |
|---|---|---|---|---|
| ☐ | Name | Measurement unit | Type | Range |
| ☐ | FlourType | n/a | Category | Coconut,Rice,Wheat |
| ☐ | FlourQuantity | grams | Float | 20 - 250 |
| ☐ | Eggs | unit | Integer | 1 - 8 |

316

DELETE

Name
BakingPowderQuantity 312    Measurement unit
                              grams
Parameter type 326            328
Float                         Upper bound
Lower bound                   10
314
1

ADD

BACK    NEXT

EXPERIMENTS 310

Parameters

| Name | | |
|---|---|---|
| Enter a name | | |

Measurement unit
Enter a measurement unit

Parameter type ▽

Lower bound ⇕    Upper bound ⇕

ADD

NEW EXPERIMENT — 330

| | Name | Measurement unit | Type | Range |
|---|---|---|---|---|
| ☐ | FlourType | n/a | Category | Coconut,Rice,Wheat |
| ☐ | FlourQuantity | grams | Float | 20 - 250 |
| ☐ | Eggs | unit | Integer | 1 - 8 |
| ☐ | BakingPowderQuantity | grams | Float | 1 - 10 |

DELETE

② — 316

NEXT

BACK

EXPERIMENTS

NEW EXPERIMENT — 332

EXPERIMENTS

Objectives 334

Name — 336
cake height — Measurement unit
 cm
Optimization type 338 342
Maximize 340 Upper bound
Lower bound 35
5 344
Weight
1 346

[ADD]
[BACK]

③ — 348

| ☐ Name | Measurement unit | Type | Target | Bounds | Weight |
|---|---|---|---|---|---|
| | | No data available | | | |

[DELETE]

[NEXT]

EXPERIMENTS — NEW EXPERIMENT

Objectives — 334

| Name | Measurement unit |
|---|---|
| Sponginess — 338 | range — 336 |

Optimization type
Approximate — 352 ▽

Approximation target
4 — 340 ◆

Lower bound          Upper bound
1 ◆                  5 — 342 ◆

Weight — 344
1 — 346 ◆

[ADD]

[BACK]

— 350

③ — 348

| ☐ Name | Measurement unit | Type | Target | Bounds | Weight |
|---|---|---|---|---|---|
| ☐ cake height | cm | | Maximize | 5 - 35 | 1 |

[DELETE]

[NEXT]

FIG. 3F

Constraints

Enter Parameter Constraints.

Constraints must have the form 'parameter1 + parameter2' >= 10.0.

Any number and combination of operators [+-*/] are accepted, while [>= and <=] are the accepted inequalities.

The right side of the inequalities must be a decimal number (e.g. 1.0)
356

Enter Constraint
'BakingPowderQuantity' + 'FlourQuantity' >= 25.00   358

[ADD]

[BACK]

EXPERIMENTS       NEW EXPERIMENT

354

360 ④

☐ Constraints

No data available

[DELETE]

[NEXT]

FIG. 3G

FIG. 3J cake height

374

| SUGGESTED SAMPLES | SUBMIT EXPERIMENT RESULTS | PREVIOUS EXPERIMENT RESULTS | EXPERIMENT CONFIGURATIONS |

382

Add results

Suggested Trial ID — 376

1-3 ▽

FlourType
Rice ▽

FlourQuantity (grams)
222.1818655627 ◆

Eggs (unit)
1 ◆

BakingPowderQuantity (grams)
2.01010691467626  378a ◆ cake height (cm)
14    378b ◆

Sponginess (range)
5  380 ◆

ADD    RESET

☐ ID  FlourType  FlourQuantity  Eggs  Baking Powder Quantity  cake height  Sponginess ☐ 1-1  Coconut  148.64271662198007  2  7.21176400873810005  12  2

Rows per page 10 ▽ 1-1 of 1 < >

384

SUBMIT    DELETE SELECTED

386 ↙

| | SUGGESTED SAMPLES | | | | SUBMIT EXPERIMENT RESULTS | | PREVIOUS EXPERIMENT RESULTS | cake height | | EXPERIMENT CONFIGURATIONS | |
|---|---|---|---|---|---|---|---|---|---|---|---|
| ID | Flour Type (n/a) | FlourQuantity (grams) | Eggs (unit) | BackingPowder Quantity(grams) | cake height (cm) | Sponginess (range) | Batch | Created at | Actions |
| 1-2 | Wheat | 117.32 | 7 | 3.16 | 20 | 5 | 1 | | ✎🗑 |
| 1-3 | Rice | 222.18 | 1 | 2.01 | 14 | 5 | 1 | Thu Feb 11 2021 | ✎🗑 |
| 1-1 | Coconut | 148.64 | 2 | 7.21 | 12 | 2 | 1 | Thu Feb 11 2021 | ✎🗑 |

Rows per page 10 ▽ 1-3 of 3 < >

{ 388 brackets IDs 1-2 and 1-3

| SUGGESTED SAMPLES | SUBMIT EXPERIMENT RESULTS | PREVIOUS EXPERIMENT RESULTS | EXPERIMENT CONFIGURATIONS |
|---|---|---|---| cake height

368

Number of samples: 7

370

[GENERATE NEW BATCH]

| ID | FlourType (n/a) | FlourQuantity (grams) | Eggs (unit) | BackingPowderQuantity(grams) | Batch | Created at |
|---|---|---|---|---|---|---|
| 2-0 | Wheat | 187.30 | 5 | 1 | 2 | Thu Feb 11 2021 |
| 2-1 | Wheat | 24.11 | 8 | 1.04 | 2 | Thu Feb 11 2021 |
| 2-2 | Wheat | 77.85 | 8 | 7.94 | 2 | Thu Feb 11 2021 |
| 2-3 | Wheat | 66.69 | 8 | 6.57 | 2 | Thu Feb 11 2021 |
| 2-4 | Wheat | 149.63 | 8 | 1 | 2 | Thu Feb 11 2021 |
| 2-5 | Wheat | 24.00 | 8 | 1.00 | 2 | Thu Feb 11 2021 |
| 2-6 | Wheat | 153.37 | 8 | 1.00 | 2 | Thu Feb 11 2021 |
| 1-0 | Rice | 74.31 | 4 | 3.76 | 1 | Thu Feb 11 2021 |
| 1-1 | Coconut | 148.64 | 2 | 7.21 | 1 | Thu Feb 11 2021 |
| 1-2 | Wheat | 117.32 | 7 | 3.16 | 1 | Thu Feb 11 2021 |

372

Rows per page 10 ▽  1-10 of 12  < >

402 Receiving a request identifying an experiment, wherein the experiment is associated with configuration data including parameters, at least one experiment objective, and an experiment mode

→

404 Generating a plurality of experiment trials for the experiment based on the configuration data of the experiment

→

406 Indicating the plurality of experiment trials in a response to the request, wherein each of the plurality of experiment trials includes an amount for each of the parameters and attempts to satisfy the at least one experiment objective

MACHINE LEARNING DRIVEN EXPERIMENTAL DESIGN FOR FOOD TECHNOLOGY

TECHNICAL FIELD

One technical field of the present disclosure is artificial intelligence and machine learning, as applied to food. Another technical field is food science. The disclosure relates, in particular, to use of machine learning to generate samples for a food science experiment that optimize objectives of the experiment.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Food scientists and chefs conduct food experiments that include many variables. For example, to make yogurt with a pH below 6, the amount of water, sugar and probiotic, as well as the sugar type and the probiotic type need to be determined. Variables, such as water, sugar, and probiotics, are experimented with. Today, trials are run by holding all but one variable constant and varying that variable to determine how it affects the outcome. Different trials with different varying variables are run until an experiment objective (e.g., pH below 6) is achieved. This approach is inefficient as it involves extensive time to reach an objective and wastes physical resources. Accordingly, there is a need for techniques that assist food scientists and chefs during the experimentation process to achieve experimentation objectives in the least number of trials possible.

SUMMARY

The appended claims may serve as a summary of the invention.

BRIEF DESCRIPTION OF THE FIGURES

The present invention is illustrated by way of example, and not by way of limitation, in the figures of the accompanying drawings and in which like reference numerals refer to similar elements and in which:

FIGS. 3A-3L illustrate example GUI displays of an experiment generator in accordance with some embodiments.

FIG. 4 illustrates an example method to generate experiments in accordance with some embodiments.

DETAILED DESCRIPTION

Figure 1:
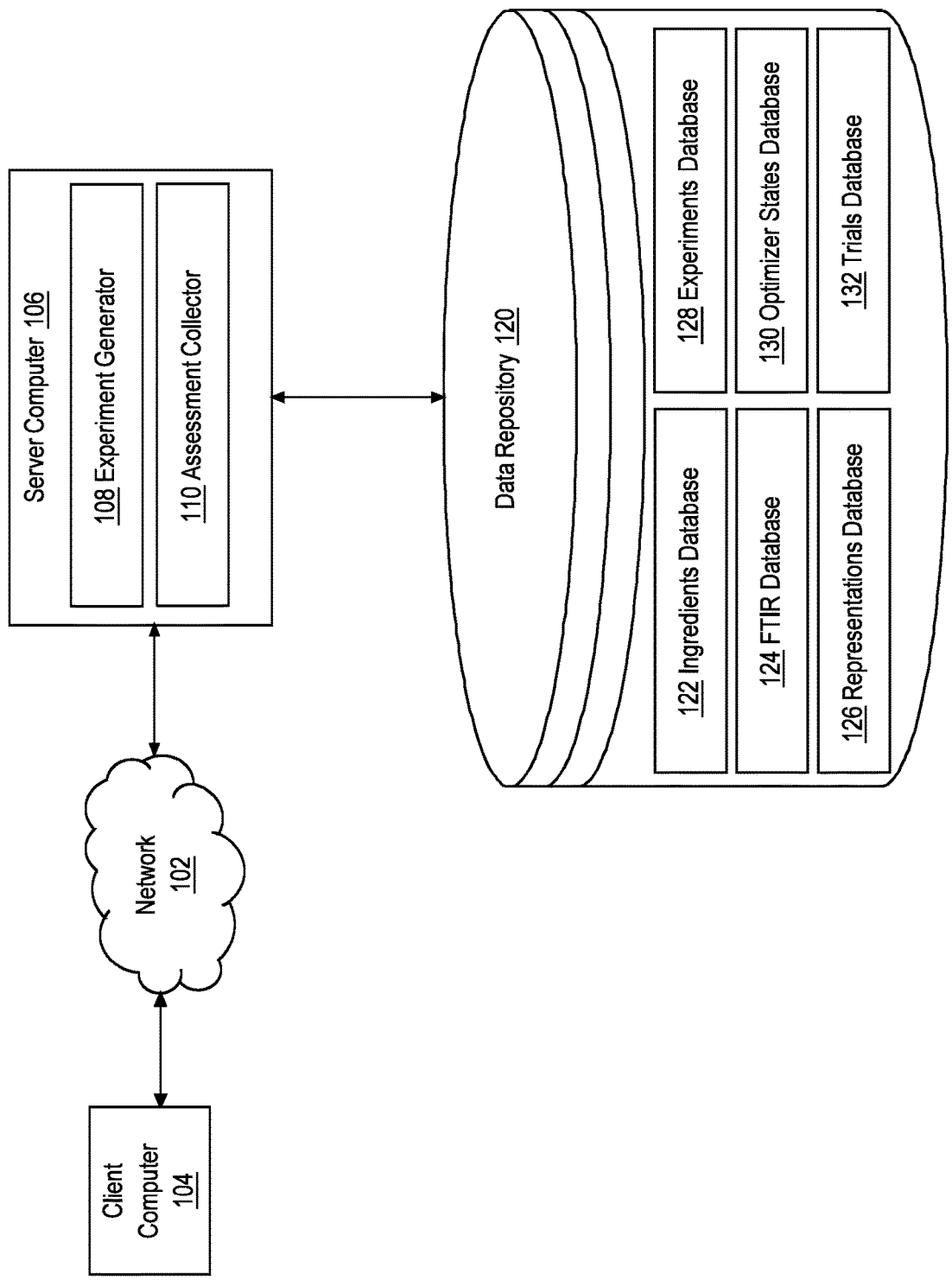
FIG. 1 illustrates an example networked computer system with which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein in sections according to the following outline:
1.0 GENERAL OVERVIEW
2.0 STRUCTURAL OVERVIEW
3.0 FUNCTIONAL OVERVIEW
　　3.1 EXPERIMENT GENERATOR
　　　　3.1.1 LOCAL OPTIMIZATION IN MODE A
　　　　3.1.2 LOCAL OPTIMIZATION IN MODE B
　　　　3.1.3 LOCAL OPTIMIZATION IN MODE C
　　3.2 ASSESSMENT COLLECTOR
4.0 EXAMPLE STORAGE WORKFLOW
5.0 GRAPHICAL USER INTERFACE IMPLEMENTATIONS
6.0 PROCEDURAL OVERVIEW
7.0 HARDWARE OVERVIEW
8.0 SOFTWARE OVERVIEW
9.0 OTHER ASPECTS OF DISCLOSURE 1.0 General Overview Computer-implemented techniques to propose food experiment trials using artificial intelligence are disclosed. At each generation of an experiment generator, the experiment generator generates a batch of one or more experiment trials for an experiment. Configuration data for the experiment may be provided by a user and includes parameters, at least one experiment objective, an experiment mode, and one or more optional parameter constraints. The experiment generator is optimized using one of a plurality of optimization algorithms. The optimization algorithm used is dependent on the experiment mode of the experiment. Each experiment trial generated by the experiment generator includes an amount associated with each of the parameters of the experiment. Each experiment trial is within parameter constraints, if any, and attempts to satisfy the experiment objectives.

In an embodiment, a computer-implemented method of generating trials for food experimentation comprising: receiving, from a computing device, a request identifying a food experiment, wherein the food experiment is associated with configuration data including parameters, at least one food experiment objective, and a food experiment mode; generating, by an artificial intelligence model, a plurality of food experiment trials for the food experiment based on the configuration data of the food experiment; wherein the artificial intelligence model includes a global optimizer configured to sample from a distribution of assessed food experiment trials in a training dataset; wherein generating the plurality of food experiments trials comprises: selecting, based on the food experiment mode, an optimization algorithm from a plurality of optimization algorithms; using the optimization algorithm to generate the distribution; and sampling from within a search domain of the distribution; and indicating the plurality of food experiment trials in a response to the request, wherein each of the plurality of food experiment trials includes an amount for each of the parameters and attempts to satisfy the at least one food experiment objective.

Embodiments of the invention disclosed herein use a Bayesian Optimization machine learning technique to minimize the number of trials run in order to achieve an experiment objective. A grid search technique could also achieve the experiment objective but requires many more trials. The Bayesian Optimization machine learning algorithm, based on previous observations or search results, focuses its next search on a relevant area of a search space that have high performing results (e.g., best achieve the experiment objective). The Bayesian Optimization machine learning technique is more efficient and more accurate since every search is "guided" from previous search results. All embodiments disclosed and claimed herein are directed to a computer-implemented programmed processes that interact with digital data to provide a practical application of computing technology to the problem of generating trials for experimentation that achieve experiment objectives. The disclosure is not intended to encompass techniques for organizing human activity, for performing mental processes, or for performing a mathematical concept, and any interpretation of the claims to encompass such techniques would be unreasonable based upon the disclosure as a whole.

Other embodiments, aspects, and features will become apparent from the reminder of the disclosure as a whole.

2.0 Structural Overview

FIG. 1 illustrates an example networked computer system 100 with which various embodiments may be practiced. FIG. 1 is shown in simplified, schematic format for purposes of illustrating a clear example and other embodiments may include more, fewer, or different elements. FIG. 1, and the other drawing figures and all of the description and claims in this disclosure, are intended to present, disclose, and claim a technical system and technical methods comprising specially programmed computers, using a special-purpose distributed computer system design and instructions that are programmed to execute the functions that are described. These elements execute functions that have not been available before to provide a practical application of computing technology to the problem of generating trials for experimentation that achieve experiment objectives. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In the example FIG. 1, the networked computer system 100 comprises a client computer(s) 104, a server computer 106, a data repository(ies) 120, which are communicatively coupled directly or indirectly via one or more networks 102. In an embodiment, the server computer 106 broadly represents one or more computers, such as one or more desktop computers, server computers, a server farm, a cloud computing platform (like Amazon EC2, Google Cloud, container orchestration (Kubernetes, Docker, etc.)), or a parallel computer, virtual computing instances in public or private datacenters, and/or instances of a server-based application.

The server computer 106 includes one or more computer programs or sequences of program instructions that is organized to implement experiment generating functions and assessment collecting functions. Programs or sequences of instructions organized to implement the experiment generating functions may be referred to herein as an experiment generator 108. Programs or sequences of instructions organized to implement the feedback collecting functions may be referred to herein as an assessment collector 110.

In an embodiment, the experiment generator 108 is programmed to generate a batch of at least one experiment trial, based on parameters (e.g., variables), objectives, and domain of an experiment, for a user (e.g., scientist, researcher, chef) to try (e.g., to experiment on). Each generated experiment trial in an experiment batch includes the same set of parameters but with varying quantities, amounts, or proportions (referred herein to as quantities) that are determined to be within the domain of the experiment. As further described below, the experiment generator 108 runs in one of a plurality of modes (e.g., Mode A, Mode B, Mode C) depending on an experiment mode associated with the experiment.

The experiment generator 108 may include, apply, employ, perform, use, be based on, and/or otherwise be associated with artificial intelligence approaches (e.g., machine learning approaches, etc.) including any one or more of: supervised learning (e.g., using gradient boosting trees, using logistic regression, using back propagation neural networks, using random forests, decision trees, etc.), unsupervised learning (e.g., using an Apriori algorithm, using K-means clustering), semi-supervised learning, a deep learning algorithm (e.g., neural networks, a restricted Boltzmann machine, a deep belief network method, a convolutional neural network method, a recurrent neural network method, stacked auto-encoder method, etc.), reinforcement learning (e.g., using a Q-learning algorithm, using temporal difference learning), a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminant analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable artificial intelligence approach.

In an embodiment, the assessment collector 110 is programmed to associate user-provided assessment data with an experiment trial previously generated by the experiment generator 108. The assessment data describes how close properties of a cooked food item produced from the experiment trial are to corresponding experiment objectives. Example experiment objectives are viscosity, texture, pH, fermentation time, etc.

In some embodiments, to provide modularity and separation of function, the experiment generator 108 and the assessment collector 110 are implemented as a logically separate program, process or library.

The server computer 106 also includes receiving instructions (not illustrated) and displaying instructions (not illustrated). The receiving instructions are programmed to receive data from a client computer 104 and/or a data repository 120 for further processing. For example, the receiving instructions may be programmed for receiving user input, such as user input specifying parameters, objectives, domain, assessments, etc. The displaying instructions are programmed to cause one or more computing devices, such as a client computer 104 to display a graphical user interface (GUI) including content, such as content from and/or generated by the experiment generator 108 and/or the assessment collector 110. Other sets of instructions may be included to form a complete system such as an operating system, utility libraries, a presentation layer, database interface layer and so forth.

Computer executable instructions described herein may be in machine executable code in the instruction set of a CPU and may have been compiled based upon source code written in Python, JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the figure may represent the manner in which programmers or software developers organize and arrange source code for later compilation into an executable, or interpretation into bytecode or the equivalent, for execution by the server computer 106.

The server computer 106 may be coupled to the data repository 120 that includes an ingredients database 122, a Fourier Transform Infrared Spectroscopy (FTIR) database 124, a representations database 126, an experiments database 128, an optimizer states database 130, and a trials database 132. As used herein, the term "database" refers to a corpus of data, organized or unorganized, in any format, with or without a particular interface for accessing the corpus of data. Each database 122, 124, 126, 128, 130, 132 may be implemented using memory, e.g., RAM, EEPROM, flash memory, hard disk drives, optical disc drives, solid state memory, or any type of memory suitable for database storage.

The ingredients database 122 includes raw food ingredients. An ingredient may be plant-based, animal-based, water-based, synthetic, or a combination thereof. Some non-limiting examples of plant-based ingredients may include vegetables (e.g., onions, potatoes, garlic, spinach, carrots, celery, squash, etc.), fruits (e.g., apples, pears, grapes, etc.), herbs (e.g., oregano, cilantro, basil, etc.), spices (e.g., black peppers, turmeric, red chili peppers, cinnamon, etc.), oils (e.g., corn oil, olive oil, etc.), nuts (e.g., almonds, walnuts, pistachios, etc.), legumes (e.g., lentils, dried peas, soybeans, etc.), starch, proteins, fibers, carbohydrates, sugar, etc. Some non-limiting examples of animal-based ingredients may include dairy products (e.g., milk, butter, cheese, yogurt, ice cream, etc.), egg-based products (e.g., mayonnaise, salad dressings, etc.), meat products (e.g., burger patties, sausages, hot dogs, bacon, etc.), and/or seafood (e.g., fish, crab, lobsters, etc.). Synthetic ingredients may include artificially produced food, e.g., artificial meats, artificial sweeteners, artificial milk, etc.

One or more ingredients in the ingredients database 122 may be associated with corresponding FTIR data, which may be stored with the ingredients in the ingredients database 122 or separately from the ingredients in the FTIR database 124. FTIR spectrum of an ingredient, from the ingredients database 122, may be obtained using FTIR techniques. For example, infrared radiation (IR) is applied to the ingredient and the ingredient's absorbance of infrared light at various wavelengths is measured, using a FTIR spectrometer, to determine its molecular composition. Values of infrared absorbance are recorded for wavenumbers, for example, between 400 $cm^{-1}$ and 4000 $cm^{-1}$. Absorbance values are plotted against wavenumbers to obtain the FTIR spectrum of the ingredient.

FTIR data (e.g., FTIR spectrum) of an ingredient may be associated with a corresponding representation vector. Representation vectors may be stored as representation data with corresponding ingredients in the ingredients database 122 or separately from the ingredients in the representations database 126. As discussed below, FTIR data is run through an autoencoder, such as a neural network, to compress them into representational vectors of dimension d (e.g., d=20).

In an embodiment, the experiments database 128 includes data relating to experiments. Experiment data may be user provided and includes parameters, objectives, domain, an experiment mode, and other data for each respective experiment in the experiments database 128. Domain identifies a search space and is based on parameter configurations, parameter constraints, and objective configurations.

In an embodiment, the optimizer states database 130 includes data relating to optimizers. Optimizer data includes optimizer state information, such as gradients, weights, biases, and/or other properties, that are required to run the plurality of optimizers used by the experiment generator 108, which in turn allows the experiment generator 108 to operate along previous trajectories.

In an embodiment, the trials database 132 includes data relating to experiment trials. Each experiment trial in the trials database 132 includes information needed for a user to try the experiment trial (e.g., ingredients and corresponding quantities), is associated with a local optimizer, and may be updated with assessment data. The assessment data describes how close one or more properties of a cooked food item for an experiment trial is to one or more experiment objectives. Historical data refers to assessed experiment trials in the trials database 132 (e.g., experiment trials that have corresponding assessment data).

The network 102 broadly represents a combination of one or more local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein may be configured to connect to the network 102 and the disclosure presumes that all elements of FIG. 1 are communicatively coupled via the network 102. The various elements depicted in FIG. 1 may also communicate with each other via direct communications links that are not depicted in FIG. 1 for purposes of explanation.

The server computer 106 is accessible over the network 102 by a client computer 104 to request experiment trials to try and to provide assessment on experiment trials in which cooked food items have been produced from the experiment trials. The client device 104 may comprise a desktop computer, laptop computer, tablet computer, smartphone, or any other type of computing device that allows access to the server computer 106. The elements in FIG. 1 are intended to represent one workable embodiment but are not intended to constrain or limit the number of elements that could be used in other embodiments.

3.0 Functional Overview

The server computer 106, including the experiment generator 108 and the assessment collector 110, and the data repository 120 interoperate programmatically in an unconventional manner to generate a batch of one or more experiment trials, from a search space, that try to achieve experiment objective(s). Each generated experiment trial in the experiment batch includes the same set of ingredients but with varying quantities. Parameters of an experiment are variables identified for the experiment. A parameter or variable identifies an ingredient and may be continuous (e.g., float), a discrete (e.g., integer), or categorical (e.g., having more than one category).

A batch of one or more experiment trials may be displayed on the client device 104. In an embodiment, each experiment trial in the batch may be transmitted downstream to a recipe generator for further processing such as to determine a new recipe including a set of cooking directions or instructions for that experiment trial. Example recipe generators are described in co-pending U.S. patent application Ser. No. 16/416,095, filed May 17, 2019, titled "Systems and Methods to Mimic Target Good Items using Artificial Intelligence," and in co-pending U.S. patent application Ser. No. 17/317,780, filed May 11, 2021, titled "Formula and Recipe Generation with Feedback Loop," wherein the entire contents of each of which are hereby incorporated by reference as if fully set forth herein.

3.1 Experiment Generator

In an embodiment, the experiment generator 108 includes a global optimizer based on Bayesian Optimization. In each generation of the experiment generator 108, experiment trials are generated, suggested, or otherwise determined by presenting an optimization problem to the global optimizer by efficiently sampling a multivariate Gaussian distribution to achieve one or more experiment objectives. A surrogate model, such as a Gaussian Process, is trained using training dataset to form a posterior distribution that approximates the multivariate Gaussian distribution. The training dataset includes observed points from assessed experiment trials (e.g., historical data from the trials database 132). An acquisition function is built to determine which point to sample from the multivariate Gaussian distribution to find the optimum to the problem (e.g., at the maximum of the acquisition function). Different modes of the experiment generator 108 define different criteria for the acquisition function and uses local optimizers to determine optimal points. One or more optimal points are sampled during optimization, are presented during evaluation, become experiment trial proposals to be assessed by a user, and become, with the assessment, part of the historical data, which in turn update the multivariate Gaussian distribution. The cycle starts again as, in the next generation, another acquisition function is built, and one or more optimal points are sampled. The cycle may end when the experiment objectives are achieved. The more data points there are, the better the fit to the multivariate Gaussian distribution.

The experiment generator 108 runs in one of a plurality of modes, depending on experiment mode. The plurality of modes includes a first mode (referred herein as Mode A) that supports continuous variables and discrete (e.g., integer) variables, a second mode (referred herein as Mode B) that supports continuous variables, discrete variables, and categorical variables without use of custom representation, and a third mode (referred herein as Mode C) that supports continuous variables, discrete variables, and categorical variables with use of custom representation. In an embodiment, Mode B differs from Mode C in that categorical variables are one-hot encoded rather than encoded using representational learning.

In every generation, the experiment generator 108 uses relevant state information and historical data, from the data repository 120, that are pertinent to an experiment to generate a batch of one or more experiment trials. All modes may be first initialized using a batch of quasi-random low-discrepancy numbers, such as a Sobol numbers, if no historical data is available.

3.1.1 Local Optimization in Mode A

The experiment generator 108 may be programmed to run in Mode A for experiments that contain continuous variables and/or discrete variables. An example use case for Mode A may be an experiment with varying concentrations of fixed ingredients, such as sugar to protein ratio.

A Matern kernel (e.g., Matern 5/2 kernel), which is a covariance kernel function, may be used in the Gaussian Process to define covariance (e.g., nearness or similarity) of two points within the multivariate Gaussian distribution. The acquisition function may be the Expected Improvement (EI). The EI is built on top of the Gaussian Process, which uses the historical data to construct the posterior distribution. The EI acquisition function may be first optimized using a local search algorithm, such as the Broyden-Fletcher-Goldfarb-Shanno (BFGS) algorithm, with 100 restarts. One type of BFGS is limited-memory BFGS (L-BFGS), such as L-BFGS-B.

Parameters represented as integers are relaxed into a continuous space (e.g., integers are transformed into floating point values) during optimization. The experiment generator 108 returns a continuous point, a floating point value, which is then rounded to the nearest integer during evaluation (after optimization). In an embodiment, parameters represented as integers may be normalized into floating point values between 0 and 1. Outputs from the experiment generator 108 are unnormalized and presented as a result (e.g., batch of one or more experiment trials). In an embodiment, the same techniques for parameters represented as integers are used in Mode B and Mode C.

3.1.2 Local Optimization for Mode B

The experiment generator 108 may be programmed to run in Mode B for experiments that contain continuous variables, discrete variables, and/or categorical variables that do not have custom representations. An example use case for Mode B may be an experiment with a small number of categorical choices or for an ingredient for which there is no representation (e.g., not embedded into a representational space).

In Mode B, all categorical parameters input to the experiment generator 108 are one-hot encoded. For example, if Dextrose is chosen out of [Dextrose, Sucrose, Fructose], then sugar would be represented as [1, 0, 0]. In particular, the input dimension of a categorical parameter is the number categories for a corresponding parameter. Each point maximized by the acquisition function, which is continuous, is rounded to the nearest category, which is then presented as a result. For example, the point [0.7, 0.2, 0.1] for sugar would be rounded to [1, 0, 0]. When an experiment trial is evaluated, the output (e.g., [1, 0, 0]) is associated with the continuous representation (e.g., [0.7, 0.2, 0.1]) of the experiment trial.

A covariance function used in the Gaussian Process uses a rounding technique to handle rounding (e.g., [0.7, 0.2, 0.1]

rounded to [1, 0, 0]). An example rounding technique is one presented in "Dealing with Categorical and Integer-valued Variables in Bayesian Optimization with Gaussian Processes" to Garrido-Merchán et al. During optimization, the local optimizer generates a continuous representation of a one-hot encoded vector. This continuous representation is rounded not only during evaluation but also within the covariance function. The acquisition function may be the Upper Confidence Bound (UCB) with a decaying beta. The covariance kernel may be one in the Matern family, such as a Matern 5/2 kernel.

As discussed above, parameters represented as integers are relaxed into a continuous space during optimization. However, in Mode B, integers may lead to repeat trial suggestions. For example, if there is an experiment with one categorical variable with three categories A, B, C, and one integer variable, then the local optimizer could suggest points (C, 1.6) and (C, 1.9), which it sees as separate experiment trials. Duplicate points (C, 2) and (C, 2) would be suggested to the user but, instead, duplicates are filtered out such that (C, 2) is suggested only once to the user.

Duplicates can occur for another reason. For the categorical variable, the representation for C is [0, 0, 1]. Since the local optimizer does not model discretely, the optimizer may suggest two points [0.3, 0.5, 0.9] and [0.2, 0.3, 0.4] for C, which it sees as two separate experiment trials. In this manner, duplicates appear as both are rounded to [0, 0, 1]. Duplicates are filtered out such that [0, 0, 1] is suggested only once to the user.

3.1.3 Local Optimization for Mode C

The experiment generator 108 may be programmed to run in Mode C for experiments that contain continuous variables, discrete variables, and/or categorical variables that have custom representations. An example use case for Mode C may be an experiment with a large set of possible ingredients of which there are generated representations.

In Mode C, all categorical parameters input to the experiment generator 108 have corresponding representations. In an embodiment, representation of an ingredient is based on FTIR spectrum. An autoencoder, such as a neural network autoencoder, compresses FTIR spectra into ingredient embeddings. Each ingredient embedding, which is encoded representation of a corresponding ingredient, may be represented as a representational vector of d dimensions where d is the size of the representational vector (e.g., d=20). In an embodiment, all representational vectors are generated prior to user interaction with the experiment generator 108.

In an embodiment, a search space for categorical variables with custom representations, is transformed into d-dimensions. When a representational vector for an ingredient is input into the experiment generator 108, a covariance function measures similarities between each representational vector and understands the similarities and differences between ingredients (e.g., proteins). In particular, the kernel works over the past input trials to create the posterior distribution. The covariance kernel may be one in the Matern family, such as a Matern 5/2 kernel. The acquisition function works over this posterior distribution to find the optimal next experiment trials. The acquisition function may be the EI, which may be first optimized using a local search algorithm, such as the BFGS algorithm. One type of BFGS is limited-memory BFGS (L-BFGS), such as L-BFGS-B. The optimization function (e.g., BFGS) is run over every categorical variable.

For example, assume there are n categorical ingredients for which there are corresponding representational vectors. During optimization time, the n representational vectors iterated over, holding them constant while maximizing the acquisition function over continuous and integer variables. This generates k×n results, where k is a hyperparameter that signifies the number of experiment trials that should be generated per categorical choice. Trial configurations that maximize the acquisition function out of k×n optimization results are returned. The k×n experiment trials are transformed back from representational vectors to their categorical variables. Any duplicates that may have arisen due to integer variables are removed, as described above.

3.2 Assessment Collector

The assessment collector 110 may be programmed to associate user-provided assessment with an experiment trial. Assessment data describes how close one or more properties of a cooked food item for the experiment trial is to one or more experiment objectives. In an embodiment, the assessments are validated to be contained in the predetermined objective bounds and can be edited/deleted by users, as necessary.

4.0 Example Data Flow

As discussed above, experiments, optimizer states, and trials are stored in respective databases 128, 130, 132. Each experiment, in the experiments database 128, defines parameters, objectives, domain, and an experiment mode. An optimizer state, in the optimizer states database 130, may be associated with a local optimizer at a certain time and tracks the necessary information to run the local optimizer such as custom representations of ingredients. Each experiment trial, in the trials database 132, defines variables and associated quantities that a user could try, and could be updated with assessed value provided by the user. Each experiment trial, in the trials database 132, is associated with an experiment and a state. In each generation, digital data, including experiments, local optimizer states, and trials, from the respective databases 128, 130, 132 are used by the experiment generator 108 to generate a batch of one or more experiment trials.

Figure 2:
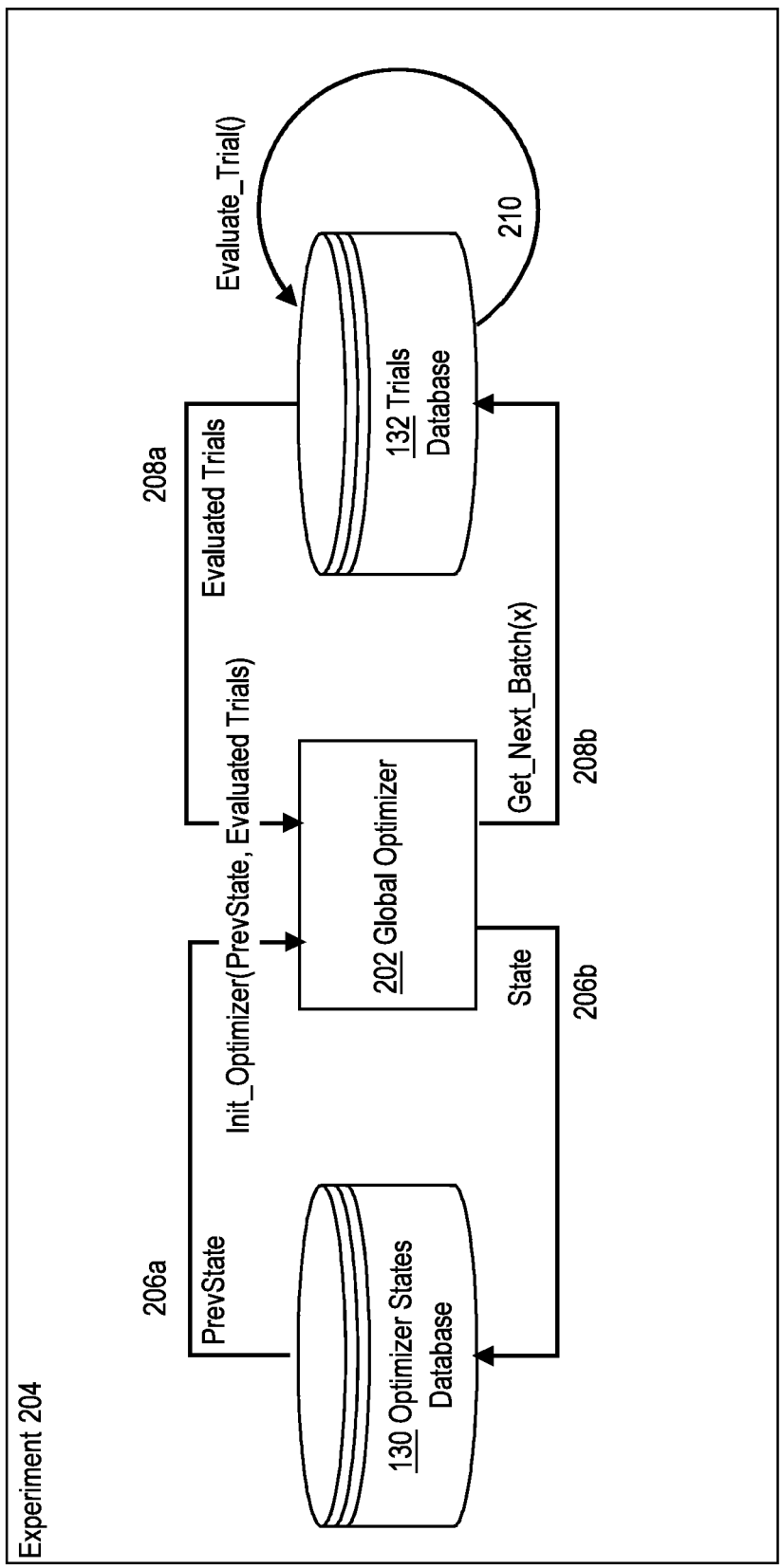
FIG. 2 illustrates an example data flow that may represent an algorithm to form the basis of programming a computer to implement experiment generation in accordance with some embodiments.

FIG. 2 illustrates an example diagram of a data flow 200 that may represent an algorithm to form the basis of programming a computer to implement experiment trial generation, according to an embodiment. The data flow 200 of FIG. 2 describes flow of data during generation of experiment trials for an experiment 204. The data flow 200 includes three loops in which data flow from and to the global optimizer 202. A first loop is shown at the left of FIG. 2, a second loop is shown in the middle of FIG. 2, and a third loop is shown at the right of FIG. 2. In every generation, the data is used by the global optimizer 202 to generate a batch of experiment trials for the experiment 204.

When the global optimizer 202 runs, the global optimizer 202 produces a new instance of an optimizer state of a local optimizer corresponding to the experiment mode of the experiment 204, at step 206*b*. The optimizer states database 130 is updated with the new optimizer state. For each subsequent run for the experiment 204, the global optimizer 202 is given the previous optimizer state of the local optimizer as an input, at step 206*a*. The local optimizer in essence determines a posterior distribution and builds an acquisition function to determine which point to sample from the multivariate Gaussian distribution. This forms one of the plurality of data loops of the data flow 200. The first run of the global optimizer 202 will not have a parent optimizer state.

At each run, the global optimizer 202 learns from evaluated trials (e.g., assessed experiment trials), at step 208*a*. The assessed experiment trials are from the trials database 132. In an embodiment, the global optimizer 202 is initialized with a set of initially generated trials. For example, when no historical data is available from the trials database 132, the set of initially generated trials may include quasi-random low-discrepancy numbers, such as a Sobol numbers. Subsequently, the global optimizer 202 uses the assessed experiment trials to generate a new batch of one or more experiment trials, at step 208b. The trials database 132 is updated with the new batch of experiment trials. This forms another one of the plurality of data loops of the data flow 200.

A user may assess one or more experiment trials in the batch from the trials database 132 and provide assessment data. The trials in the trials database 132 are updated with the assessment data provided by the user, at step 210. Assessed experiment trials are used as input to the global optimizer 202 at each run subsequent the first run. This forms yet another one of the plurality of data loops of the data flow 200.

In an embodiment, the global optimizer 202 is initialized by a call to the Inn_Optimizer( ) function. The global optimizer 202 is initialized based on a previous optimizer state of the local optimizer and assessed experiment trials from the trials database 132. The Get_Next_Batch( ) function generates a batch of X experiment trials, where X (e.g., 5) is provided by a user. The Evaluate_Tria( ) function updates the trials database 132 with assessed data provided by the user.

The more assessed experiment trials there are in the trials database 132, the more efficient the global optimizer 202 is as next suggestions are made in an informed manner by considering historical data. By making suggestions in an informed manner, the global optimizer 202 may enable itself to focus on those areas of the search space that it believes will best achieve the experiment objectives. In an embodiment, the global optimizer 202 not only suggests points in a particular area of the search space that it thinks will achieve the best objectives (exploitation), but it also improves the model by probing a larger area of the search space to find other areas not yet refined (exploration). For example, if the global optimizer 202 finds a local minima, it may suggest trials around it for some time (e.g., multiple iterations), but it should eventually suggest other areas where the global optimizer 202 has little information.

5.0 Graphical User Interface Implementations

FIGS. 3A-3L illustrate example GUI displays of the experiment generator in accordance with some embodiments. FIGS. 3A-3L show a progressive sequence of generating experiments via the GUI and are intended to illustrate different states of visual representation as an experiment is created and experiment trials are generated, using the techniques described herein. FIGS. 3A-3L represent only one brief example of creating an experiment and suggesting experiment trials, and other implementations or embodiments may be programmed or configured to present content in different ways, with different text, characters, or complexity.

Creation of an experiment. The sequence begins with experiment setup, shown in GUI 300 of FIG. 3A. The GUI 300 includes an experiment identifier field 302 and an experiment mode selector 304. Two options are available for the experiment mode selector 304: a "Numerical Parameters" option, which is for experiments that include only numerical parameters, and a "Numerical Parameters+Categorical Options" option, which is for experiments that include both numerical and categorical parameters. Depending on which option is selected via the experiment mode selector 304, the experiment generator 108 will run in either Mode A, Mode B, or Mode C, as described above. If the "Numerical Parameters" option is selected, then the experiment generator 108 will run in Mode A. If the "Numerical Parameters+Categorical Options" option is selected, then the experiment generator 108 will run in either Mode B or Mode C. For the example experiment shown in FIG. 3A, the experiment name is "cake height" and the experiment mode selected is "Numerical Parameters+Categorical Options."

After the setup information is provided, the sequence continues with defining and adding parameters to the experiment. In particular, GUI 306 of FIG. 3B shows how a categorical parameter is defined. The GUI 306 includes a parameter identifier field 308, a measurement unit field 310, a parameter type selector 312, an add button 314, and a parameters listing 316 of parameters added to the experiment. Three options are available for the parameter type selector 312: an "Integer" option, which is for parameters that are of integer type, a "Float" option, which is the option for parameters that are of float type, and a "Category" option, which is for parameters that are of categorical type. When the "Category" option is selected, then a category field 318, a "+" button 320, and a category listing 322 are included in the GUI 306. For the example experiment, the parameter name is "FlourType." The parameter "FlourType" is a categorical variable; three categories (e.g., coconut, rice, and wheat), which are defined for the parameter via the category field 318 and the "+" button 320, are included in the category listing 322 for the parameter "FlourType." Any category in the category listing 322 may be deleted or modified. Once the parameter "FlourType" is defined or configured, the parameter can be added to the experiment via the add button 314.

GUI 324 of FIG. 3C shows how a numerical parameter is defined. Similar to the GUI 306, the GUI 324 includes the parameter identifier field 308, the measurement unit field 310, the parameter type selector 312, the add button 314, and the parameter listing 316 of parameters added to the experiment. The parameters listing 316 is updated after each parameter is added to the experiment. For example, the parameter listing 316 includes the parameter (e.g., "FlourType") previously defined in FIG. 3B and other parameters "FlourQuantity" and "Eggs." In FIG. 3C, a new parameter is being defined with "BakingPowderQuantity" as the parameter identifier and "grams" as the unit of measurement. When the "Float" option is selected, then a lower bound selector 326 and an upper bound selector 328 are included in the GUI 324. The values indicated by the lower bound selector 326 and the upper bound selector 328 define an amount range for that parameter. For example, the amount range for the parameter "BakingPowderQuantity" is between 1 and 10 grams. For another example, the amount range for the parameter "Eggs" is between 1-8 eggs. For another example, the amount range for the parameter "FlourQuantity" is between 20 and 250 grams.

GUI 330 of FIG. 3D shows four parameters in the parameter listing 316 that have been added to the "cake height" experiment. Any parameter in the parameter listing 316 may be deleted or modified.

After parameters are added to the experiment, the sequence continues with defining one or more objectives of the experiment. GUI 332 of FIG. 3E and GUI 350 of FIG. 3F each includes an objective identifier field 334, a measurement unit field 336, an optimization type selector 338, a lower bound selector 340, an upper bound selector 342, a weight selector 344, an add button 346, and an objective listing 348 of objectives added to the experiment. The values indicated by the lower bound selector 340 and the upper bound selector 342 define the bound range for that objective. Three options are available for the optimization type selector 338: a "Maximize" option, in which the objective is maximized within the bound range, a "Minimize" option, in which the objective is minimized within the bound range, and an "Approximate" option, in which the objective is approximated to value indicated in an approximation target field 352 of GUI 350 of FIG. 3F. The weight selector 344 indicates the importance of the objective. Once the objective is defined or configured, the objective can be added to the experiment via the add button 346. For example, once the "cake height" objective is added, it is shown in the objective listing 348 of FIG. 3F. The objective listing 348 will be updated with the "Sponginess" objective once it is added via the add button 346. Any objective in the objective listing 348 may be deleted or modified.

After objectives are added to the experiment, the sequence continues with defining parameter constraints. GUI 354 of FIG. 3G includes a constraint field 356, an add button 358, and a constraint listing 360. In an embodiment, input to the constraint field 356 is in the form 'parameter1' [operation: +, −, *, /] 'parameter 2' [inequality: =, ≥, ≤, ≠] value, where value is a decimal number (e.g., 1.0). In FIG. 3G, "'BakingPowderQuantity'+'FlourQuantity'≥25.00" is defined as a parameter constraint that is to be added to the experiment. This parameter constraint indicates that the combined amount of the ingredient "BakingPowderQuantity" and the ingredient "FlourQuantity" must be at least 25.00 grams. The constraint listing 360 is updated with each parameter constraint added.

Figure 3A:
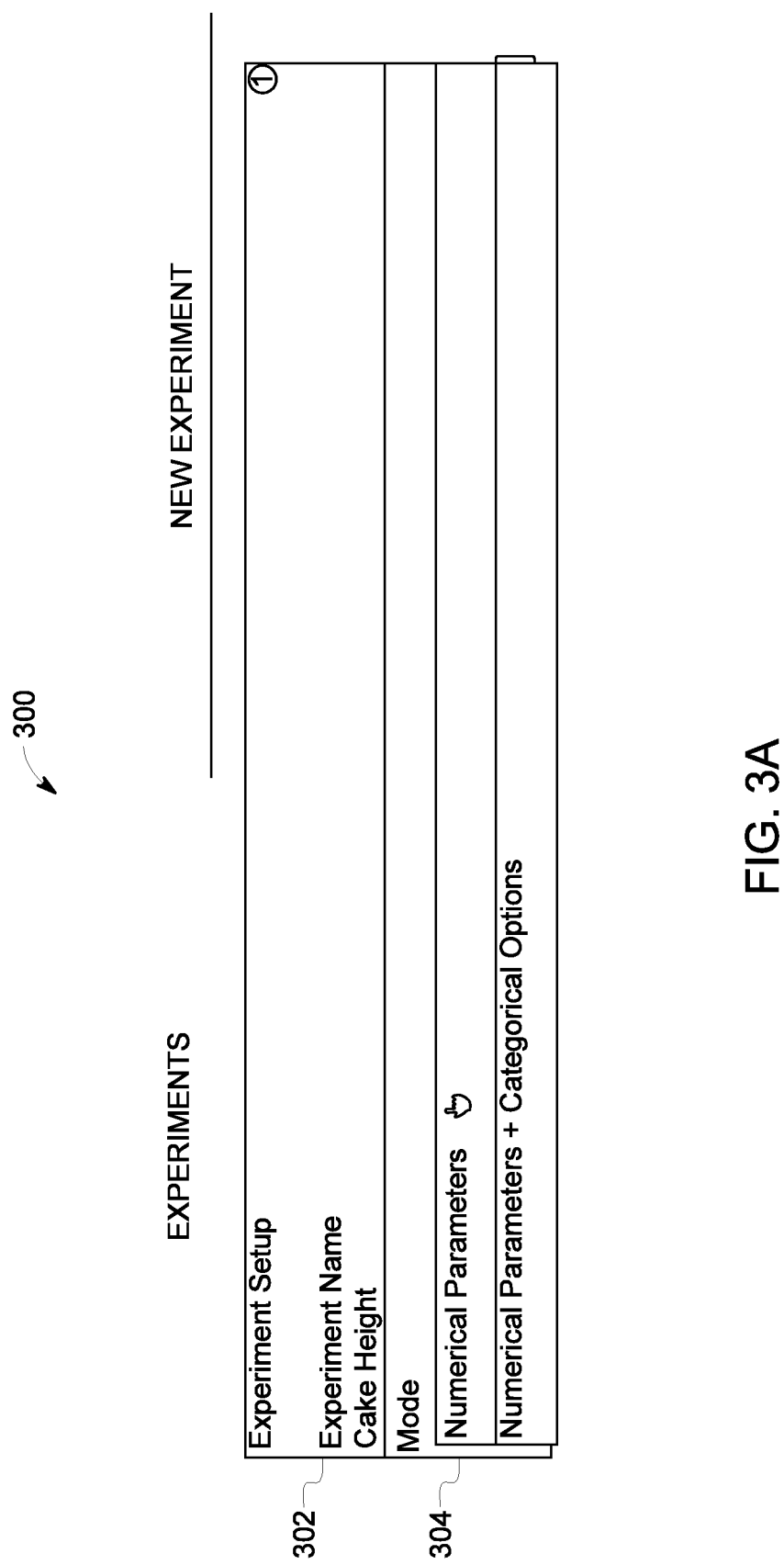
Figure 3B:
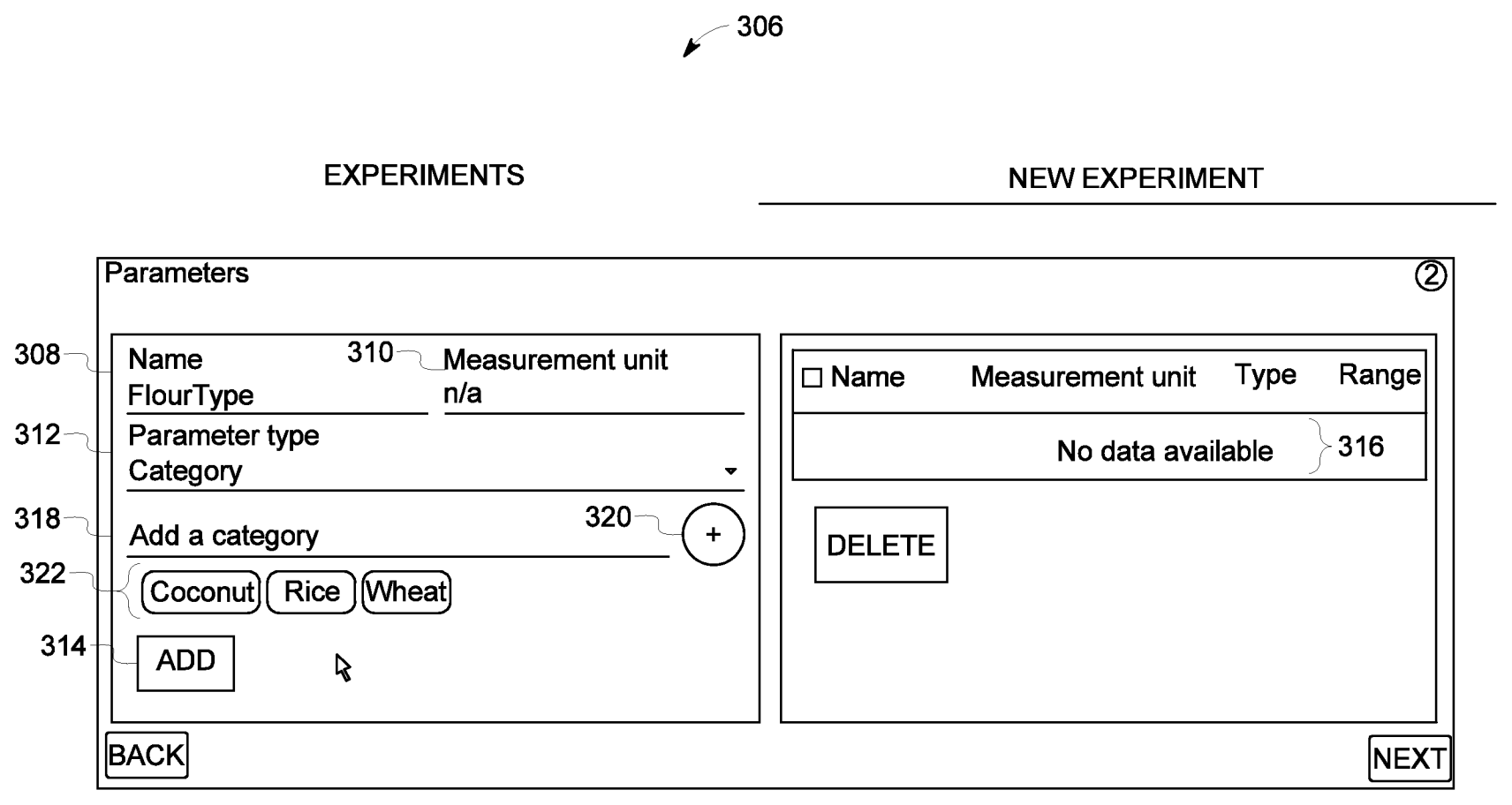
Figure 3H:
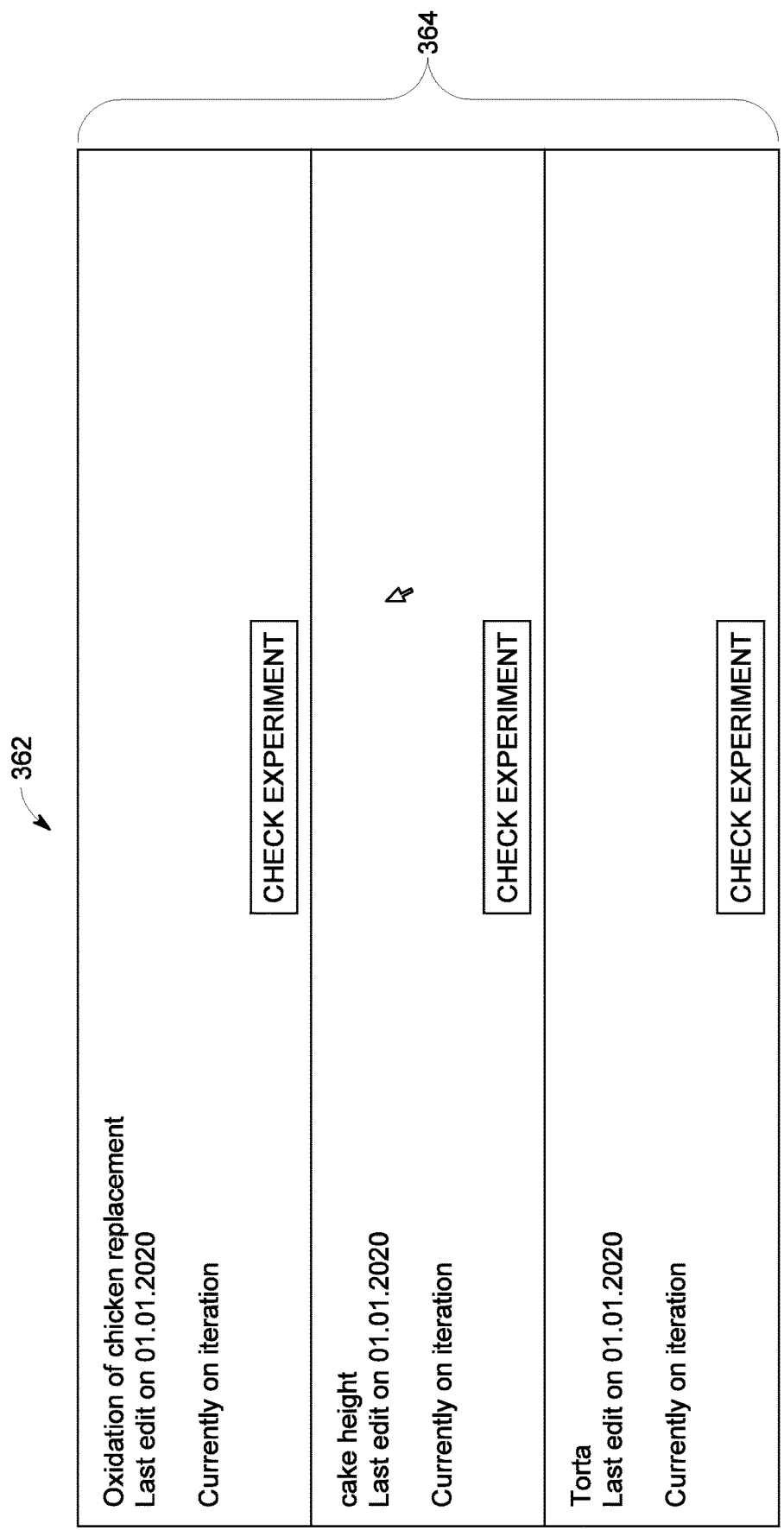
Figure 3I:

After parameter constraints are added to the experiment, the sequence continues with updating the experiments database 128 with the newly created experiment. In an embodiment, experiment configurations are first verified prior to storing the experiment in the experiments database 128. GUI 362 of FIG. 3H shows a listing of all experiments 364 from the experiments database 128. The listing of experiments 364 includes the "cake height" experiment previously created in the sequence.

Suggestion of experiment trials. An experiment from the listing of experiments 364 may be selected to generate a batch of one or more experiment trials (e.g., suggested samples). Assume that the "cake height" experiment is selected from the GUI 362. GUI 366 of FIG. 3I includes a field 368 to specify a number of experiment trials (e.g., batch size) to return from a generation and a generate button 370. Once a number is specified in the field 368 and the generate button 370 is activated, the GUI 366 is updated with a trial listing 372. The trial listing 372 includes a number of experiment trials generated by the experiment generator 108 after one generation. In the GUI 366, five experiment trials are included in the trial listing 372. Each experiment trial listed is associated with a trial identifier and includes a value for each parameter specified for the experiment, a batch number, and a timestamp. In the example, the parameters specified for the experiment are "FlourType," "FlourQuantity," "Eggs," and "BakingPowderQuantity," with corresponding measurement units of not applicable, grams, units, and grams, respectively. All the generated experiment trials in the trial listing 372 are associated with the first batch and are created on Thursday, Feb. 11, 2021. The experiment trial with identifier 1-0, suggested by the experiment generator 108, identifies 74.31 grams of rice flour, 4 eggs, and 3.76 grams of baking powder to try. The experiment trial with identifier 1-1, suggested by the experiment generator 108, identifies 148.64 grams of coconut flour, 2 eggs, and 7.21 grams of baking powder to try. The experiment trial with identifier 1-2, suggested by the experiment generator 108, identifies 117.32 grams of wheat flour, 7 eggs, and 3.16 grams of baking powder to try. The experiment trial with identifier 1-3, suggested by the experiment generator 108, identifies 222.18 grams of rice flour, 1 egg, and 2.01 grams of baking powder to try. The experiment trial with identifier 1-4, suggested by the experiment generator 108, identifies 22.22 grams of coconut flour, 8 eggs, and 6.11 grams of baking powder to try. Each of experiment trials are within the configurations and constraints of the "cake height" experiment and attempts to achieve the objectives the "cake height" experiment.

Submission of results. One or more experiment trials may be assessed to determine how close one or more properties of a cooked food item for an experiment trial is to one or more experiment objectives of the experiment (e.g., submit experiment results). GUI 374 of FIG. 3J includes a trial selector 376 to select a particular experiment trial, add button 380 to associate the assessment with the particular experiment trial, a result listing 382, and a submit button 384. Once a trial identifier is provided using the trial selector 376, a plurality of values associated with the parameters of the experiment may be automatically populated or otherwise indicated. For example, when experiment trial with identifier is selected, the parameter values of "Rice," "222.18 . . . ," "1," and "2.01 . . . " for parameters "FlourType," "FlourQuantity," "Eggs," and "BakingPowderQuantity" are automatically retrieved and shown in the GUI 374. The GUI 374 is updated to include an assessment field 378a, 378b for each objective of the experiment. In the example, there are two objectives for the "cake height" experiment: "cake height" objective and "Sponginess" objective. An assessment value may be provided in each of the fields 378a, 378b. Once assessment is provided for the experiment trial, the results listing 382 may be updated with the assessed experiment trial upon activating the add button 380. The trials database 132 may be updated with the assessed experiment trials in the results listing 382 via the submit button 384. Any assessed experiment trial in the results listing 382 may be deleted or modified.

All assessed experiment trials for the experiment (e.g., previous experiment results), from the trials database 132, may be shown in a listing 388 in GUI 386 of FIG. 3K. Each assessed experiment trial listed is associated with a trial identifier and includes a value for each parameter specified for the experiment, a batch number, a timestamp, and assessed objectives (e.g., "cake height" and "Sponginess"). Any assessed experiment trial in the listing 388 may be deleted or modified.

Subsequent suggestion of experiment trials. New assessed experiment trials for the experiment in the trials database 132 are used by the experiment generator 108 during a subsequent generation such that results of the subsequent generation better achieve experiment objectives. For example, assume a second batch (e.g., batch 2) is generated, in which assessed results from the previous batch (e.g., batch 1) are used in the generation of the second batch. GUI 390 of FIG. 3L shows results of the batch 2 generation. As shown in FIG. 3L, a difference between the two generations is that batch 2 no longer includes experiment trials with rice or coconut as the flour type as the experiment generator 108 has learned from assessed experiment trials that wheat as the flour type best achieves the objectives of the experiment.

6.0 Procedural Overview

FIG. 4 illustrates an example method 400 to generate a batch of experiment trials, in accordance with some embodiments. FIG. 4 may be used as a basis to code the method 400 as one or more computer programs or other software elements that a server computer can execute or host.

At step 402, a request is received from a computing device. Example computing device is the client computer 104. The request identifies an experiment from the experiments database 128. The experiment is associated with configuration data including parameters, at least one experiment objectives, and an experiment mode. The experiment may also be associated with at least one parameter constraint. For example, the experiment may be selected from a listing of experiments displayed in a GUI, such as the GUI 362.

At step 404, a plurality of experiment trials is generated, by an artificial intelligence model, for the experiment based on the configuration data of the experiment. The artificial intelligence model includes a global optimizer configured to sample from a distribution of assessed experiment trials in a training dataset. The global optimizer is based on Bayesian Optimization. In an embodiment, the assessed experiment trials are stored in the trials database 130.

In an embodiment, the plurality of experiment trials is generated by selecting an optimization algorithm from a plurality of optimization algorithms. An optimization algorithm may be selected based on the experiment mode of the experiment to generate a posterior distribution. According to the posterior distribution, a search domain of the distribution is sampled to generate the plurality of experiment trials. The search domain is based on parameters, parameter constraints, and experiment objectives.

In an embodiment, the plurality of optimization algorithms includes a first optimization algorithm, a second optimization algorithm, and a third optimization algorithm. The first optimization algorithm is associated with experiments that include numerical-based parameters; the second optimization algorithm is associated with experiments that include numerical-based parameters and categorical-based parameters that are not embedded in a representational space; and, the third optimization algorithm is associated with experiments that include numerical-based parameters and categorical-based parameters that are embedded in the representational space. The categorical-based parameters that are not embedded in the representational space are one-hot encoded and the categorical-based parameters that are embedded in the representational space are custom encoded.

At step 406, the plurality of experiment trials is indicated in a response to the request. Each of the plurality of experiment trials includes an amount for each of the parameters and attempts to satisfy the at least one experiment objective. For example, the plurality of experiment trials may be displayed in a GUI, such as the GUI 366.

In an embodiment, the training dataset is updated with at least one of the plurality of experiment trials and corresponding assessment data. The assessment data describes how close properties of a cooked food item produced from the experiment trial are to corresponding experiment objectives.

Techniques to generate experiment trials using artificial intelligence are disclosed. A training set for the experiment generator 108 is continuously built up by using assessed experiment trials. The experiment generator 108 is optimized using one of a plurality of optimization algorithms, depending on which mode experiment generator is to run in for an experiment. The mode is dependent on the experiment mode of the experiment. The experiment generator 108 generates a batch of one or more experiment trials for the experiment. Any of the generated experiment trials may be tried or experimented by a user and may be updated with assessment data as an assessed experiment trial. The more assessed experiment trials there in the trials database 132, the more efficient the experiment generator 108 by focusing on relevant areas of the search space that it believes will best achieve the experiment objective of the experiment.

7.0 Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perforin the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
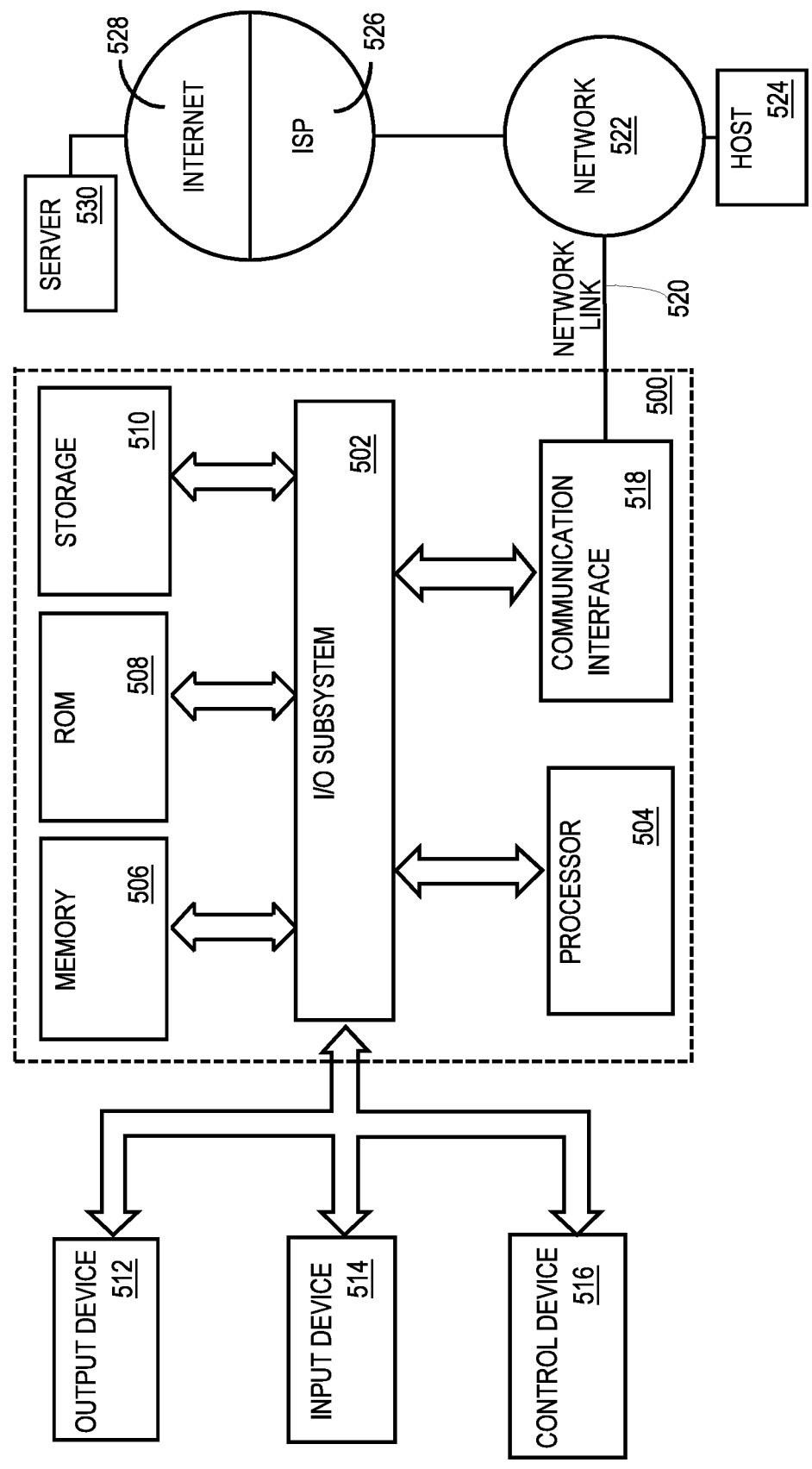
FIG. 5 illustrates a block diagram of a computing device in which the example embodiment(s) of the present invention may be embodiment.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk, or optical disk such as CD-ROM or DVD-ROM and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators, or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork, or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic, or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine, or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may foils elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

8.0 Software Overview

Figure 6:
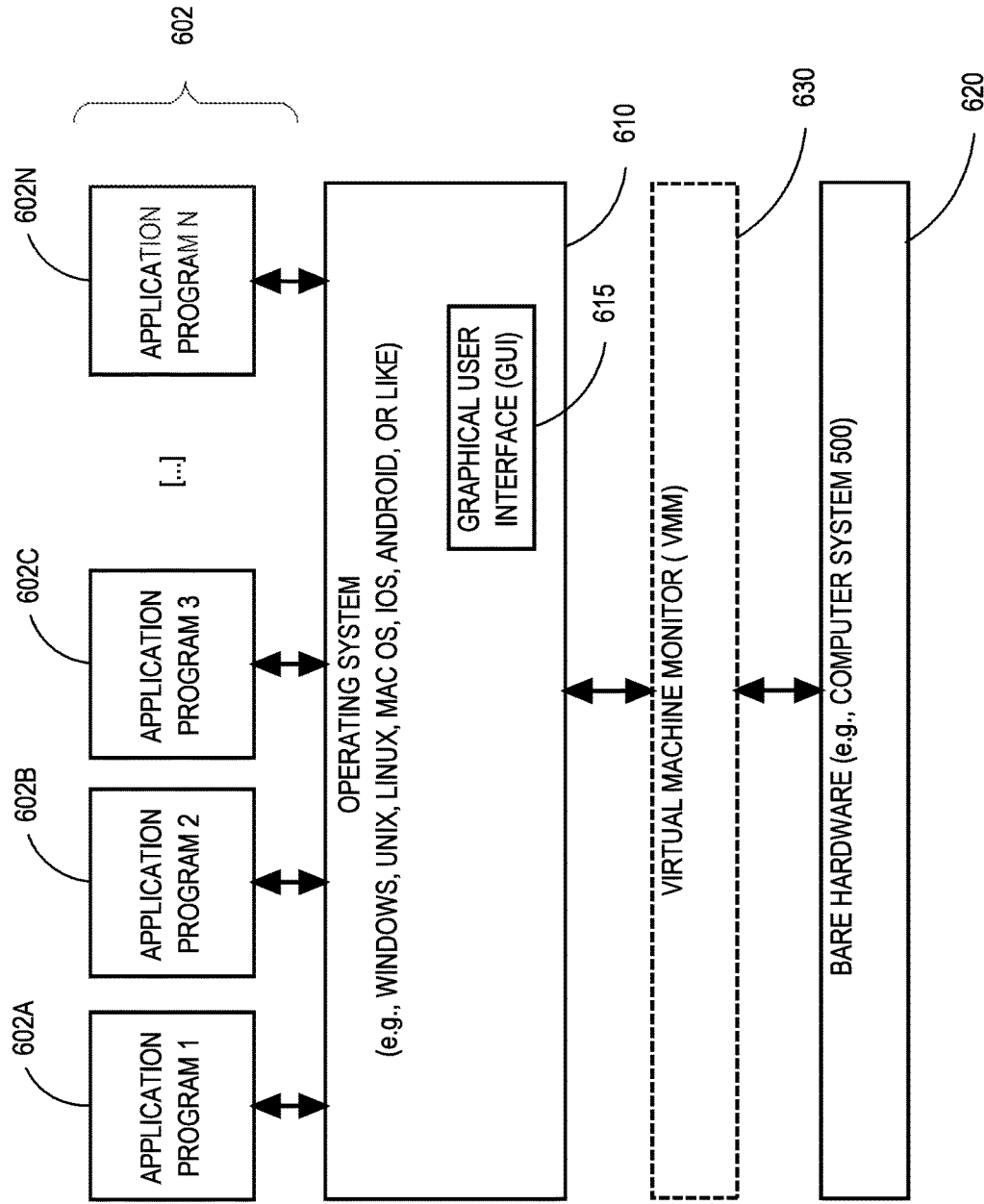
FIG. 6 illustrates a block diagram of a basic software system for controlling the operation of a computing device.

FIG. 6 is a block diagram of a basic software system 600 that may be employed for controlling the operation of computing device 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing device 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on device 600 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of device 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the device 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of device 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

9.0 Other Aspects of Disclosure

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A computer-implemented method of generating trials for food experimentation comprising:
receiving, from a computing device, a request identifying a food experiment, wherein the food experiment is associated with configuration data including ingredients, at least one food experiment objective, and a food experiment mode;

wherein the ingredients include at least one of numerical-based ingredients and categorical-based ingredients, wherein each categorical-based ingredient includes at least two subcategories;

generating, by an artificial intelligence model, a plurality of food experiment trials for the food experiment based on the configuration data of the food experiment;

wherein the artificial intelligence model includes a global optimizer configured to sample from a probability distribution of assessed food experiment trials in a training dataset;

wherein the assessed food experiment trials include previously generated food experiment trials with corresponding assessment data describing how close cooked food items for the previously generated food experiments trials are to the at least one food experiment objective;

wherein generating the plurality of food experiment trials comprises:

selecting, based on the food experiment mode, an optimization algorithm from a plurality of optimization algorithms, wherein each of the plurality of optimization algorithms defines how the ingredients are represented in the probability distribution for sampling;

using the optimization algorithm to generate a posterior distribution of the assessed food experiment trials;

sampling, according to the posterior distribution, a plurality of points from within a search domain of the probability distribution of the assessed food experiment trials, wherein a food experiment trial of the plurality of food experiment trials corresponds to a point of the plurality of points; and determining whether there are any points in the plurality of points that are duplicates and, in response to the determination, removing duplicated points; and indicating the plurality of food experiment trials in a response to the request, wherein each of the plurality of food experiment trials includes the same set of ingredients but with varying amounts of the ingredients and attempts to satisfy the at least one food experiment objective.

2. The method of claim 1, wherein the configuration data also includes at least one parameter constraint, wherein each of the plurality of food experiment trials satisfies each of the at least one parameter constraint.

3. The method of claim 1, wherein the global optimizer is based on Bayesian Optimization.

4. The method of claim 1, wherein the plurality of optimization algorithms includes:

a first optimization algorithm associated with food experiments that include numerical-based parameters;

a second optimization algorithm associated with food experiments that include numerical-based ingredients and categorical-based ingredients that are not embedded in a representational space; and a third optimization algorithm associated with food experiments that include numerical-based ingredients and categorical-based ingredients that are embedded in the representational space.

5. The method of claim 4, wherein the categorical-based ingredients that are not embedded in the representational space are one-hot encoded and the categorical-based ingredients that are embedded in the representational space are custom encoded.

6. The method of claim 4, further comprising:

obtaining Fourier Transform Infrared Spectroscopy (FTIR) spectra of ingredients;

applying an autoencoder on the FTIR spectra to obtain encoded representations of the ingredients;

wherein the categorical-based ingredients that are embedded in the representational space are each associated with an encoded representation of an ingredient corresponding with a respective categorical-based ingredient.

7. The method of claim 1, wherein the search domain is based the ingredients, parameter constraints, and the at least one food experiment objective.

8. The method of claim 1, further comprising updating the training dataset with at least one food experiment trial of the plurality of food experiment trials and corresponding assessment data for the at least one food experiment trial.

9. The method of claim 1, wherein the food experiment mode is one of a plurality of experiment modes, wherein each experiment mode of the plurality of experiment modes supports one or more types of the ingredients including the at least one of numerical-based ingredients and categorical-based ingredients in the probability distribution for sampling.

10. One or more non-transitory computer-readable storage media storing one or more instructions programmed for generating trials for food experimentation, when executed by one or more computing devices, cause:

receiving, from a computing device, a request identifying a food experiment, wherein the food experiment is associated with configuration data including ingredients, at least one food experiment objective, and a food experiment mode;

wherein the ingredients include at least one of numerical-based ingredients and categorical-based ingredients, wherein each categorical-based ingredient includes at least two subcategories;

generating, by an artificial intelligence model, a plurality of food experiment trials for the food experiment based on the configuration data of the food experiment;

wherein the artificial intelligence model includes a global optimizer configured to sample from a probability distribution of assessed food experiment trials in a training dataset;

wherein the assessed food experiment trials include previously generated food experiment trials with corresponding assessment data describing how close cooked food items for the previously generated food experiments trials are to the at least one food experiment objective;

wherein generating the plurality of food experiment trials comprises:

selecting, based on the food experiment mode, an optimization algorithm from a plurality of optimization algorithms, wherein each of the plurality of optimization algorithms defines how the ingredients are represented in the probability distribution for sampling;

using the optimization algorithm to generate a posterior distribution of the assessed food experiment trials;

sampling, according to the posterior distribution, a plurality of points from within a search domain of the probability distribution of the assessed food experiment trials, wherein a food experiment trial of the plurality of food experiment trials corresponds to a point of the plurality of points; and determining whether there are any points in the plurality of points that are duplicates and, in response to the determination, removing duplicated points; and indicating the plurality of food experiment trials in a response to the request, wherein each of the plurality of food experiment trials includes the same set of the ingredients but with varying amounts of the ingredients and attempts to satisfy the at least one food experiment objective.

11. The one or more non-transitory computer-readable storage media of claim 10, wherein the configuration data also includes at least one parameter constraint, wherein each of the plurality of food experiment trials satisfies each of the at least one parameter constraint.

12. The one or more non-transitory computer-readable storage media of claim 10, wherein the global optimizer is based on Bayesian Optimization.

13. The one or more non-transitory computer-readable storage media of claim 10, wherein the plurality of optimization algorithms includes:
a first optimization algorithm associated with food experiments that include numerical-based ingredients;
a second optimization algorithm associated with food experiments that include numerical-based ingredients and categorical-based ingredients that are not embedded in a representational space; and
a third optimization algorithm associated with food experiments that include numerical-based ingredients and categorical-based ingredients that are embedded in the representational space.

14. The one or more non-transitory computer-readable storage media of claim 13, wherein the categorical-based ingredients that are not embedded in the representational space are one-hot encoded and the categorical-based ingredients that are embedded in the representational space are custom encoded.

15. The one or more non-transitory computer-readable storage media of claim 13, wherein the one or more instructions, when executed by the one or more computing devices, further cause:
obtaining Fourier Transform Infrared Spectroscopy (FTIR) spectra of ingredients;
applying an autoencoder on the FTIR spectra to obtain encoded representations of the ingredients;
wherein the categorical-based ingredients that are embedded in the representational space are each associated with an encoded representation of an ingredient corresponding with a respective categorical-based ingredient.

16. The one or more non-transitory computer-readable storage media of claim 10, wherein the search domain is based the ingredients, parameter constraints, and the at least one food experiment objective.

17. The one or more non-transitory computer-readable storage media of claim 10, wherein the one or more instructions, when executed by the one or more computing devices, further cause updating the training dataset with at least one food experiment trial of the plurality of food experiment trials and corresponding assessment data for the at least one food experiment trial.

18. A computing system comprising:
one or more computer systems comprising one or more hardware processors and storage media; and
instructions stored in the storage media and which, when executed by the computing system, cause the computing system to perform:
receiving, from a computing device, a request identifying a food experiment, wherein the food experiment is associated with configuration data including ingredients, at least one food experiment objective, and a food experiment mode;
wherein the ingredients include at least one of numerical-based ingredients and categorical-based ingredients, wherein each categorical-based ingredient includes at least two subcategories;
generating, by an artificial intelligence model, a plurality of food experiment trials for the food experiment based on the configuration data of the food experiment;
wherein the artificial intelligence model includes a global optimizer configured to sample from a probability distribution of assessed food experiment trials in a training dataset;
wherein the assessed food experiment trials include previously generated food experiment trials with corresponding assessment data describing how close cooked food items for the previously generated food experiments trials are to the at least one food experiment objective;
wherein generating the plurality of food experiment trials comprises:
selecting, based on the food experiment mode, an optimization algorithm from a plurality of optimization algorithms, wherein each of the plurality of optimization algorithms defines how the ingredients are represented in the probability distribution for sampling;
using the optimization algorithm to generate a posterior distribution of the assessed food experiment trials;
sampling, according to the posterior distribution, a plurality of points from within a search domain of the probability distribution of the assessed food experiment trials, wherein a food experiment trial of the plurality of food experiment trials corresponds to a point of the plurality of points; and
determining whether there are any points in the plurality of points that are duplicates and, in response to the determination, removing duplicated points; and
indicating the plurality of food experiment trials in a response to the request, wherein each of the plurality of food experiment trials includes the same set of the ingredients but with varying amounts of the ingredients and attempts to satisfy the at least one food experiment objective.

19. The computing system of claim 18, wherein the configuration data also includes at least one parameter constraint, wherein each of the plurality of food experiment trials satisfies each of the at least one parameter constraint.

20. The computing system of claim 18, wherein the global optimizer is based on Bayesian Optimization.

21. The computing system of claim 18, wherein the instructions stored in the storage media and which, when executed by the computing system, cause the computing system to further perform updating the training dataset with at least one food experiment trial of the plurality of food experiment trials and corresponding assessment data for the at least one food experiment trial.

\* \* \* \* \*

UNITED STATES PATENT AND TRADEMARK OFFICE
CERTIFICATE OF CORRECTION

| | |
|---|---|
| PATENT NO. | : 11,514,350 B1 |
| APPLICATION NO. | : 17/307950 |
| DATED | : November 29, 2022 |
| INVENTOR(S) | : Kyohei Kaneko et al. |

It is certified that error appears in the above-identified patent and that said Letters Patent is hereby corrected as shown below:

In the Specification

At Column 11, Line 20, please replace Inn_Optimizer( ) with Init_Optimizer( ).

At Column 16, Lines 17-18, please replace perforin with perform.

Signed and Sealed this
Tenth Day of January, 2023

Katherine Kelly Vidal
*Director of the United States Patent and Trademark Office*